United States Patent Office 3,244,687
Patented Apr. 5, 1966

3,244,687
PROCESS FOR THE PRODUCTION OF DRY, FINE-
LY DIVIDED AND FUSIBLE POLYETHYLENE
POWDERS
Wolfgang Spindler, Stuttgart-Weilimdorf, Germany,
assignor to Coathylene S.A., a Swiss Corporation
No Drawing. Filed Sept. 4, 1959, Ser. No. 838,026
Claims priority, application Germany, May 24, 1956,
T 12,235; Sept. 8, 1958, T 15,597; July 28, 1959,
T 17,015
24 Claims. (Cl. 260—94.9)

This invention relates to the production of finely divided, fusible, dry polyethylene powders, and more particularly to a process by which such polyethylene powders of predetermined particle size may be produced from an organic liquid mixture of a solvent and a non-solvent for polyethylene.

This application is a continuation-in-part application of co-pending application Serial No. 660,474, filed May 21, 1957, now abandoned.

The production of finely divided, dry, and fusible powders of high molecular materials, particularly polyethylenes, is technically and commercially of great importance. These powders are useful for making dispersions and for the purpose of making sheets, foils, films, and the like. Solid polyethylene, however, does not form solutions at temperatures below about 60° C. and is of such a character that it may be mechanically comminuted, for instance, through grinding, only incompletely. The powders so formed, because of their angular and irregular individual particle shape, and their resultant resistance to flow are unsuitable in the production of surface coatings, for instance, for making uniform polyethylene layers, using conventional means.

It is well known that high molecular weight materials may be converted into particles of small size by dissolving these materials in a suitable solvent and subsequently slowly cooling the resulting solution while simultaneously vigorously agitating the solution, for example by stirring the same. It is important in this procedure that a slow and uniform cooling of the solution of the high molecular weight materials be carried out, in order that at all times only a slight supersaturation of the solution is maintained and consequently a settling out of only a small portion of the solid, high molecular weight material occurs in a given period of time. The application of simultaneous, vigorous stirring suitably effects a distribution of the solid portion of the high molecular material into as many individual particles as possible.

The above-described procedure, however, has many disadvantages. In this connection, the slow cooling of the solution of the high molecular weight material is not only a comparatively time-consuming operation, but also is one in which considerable mechanical energy is required for the vigorous stirring of the more-or-less heavy viscous solutions. Moreover, the finely divided material so produced may only be recovered with difficulty and even then only inefficiently, since the liquid may be removed in the cold only incompletely as, for instance, by filtering or centrifuging means. To attain a complete drying of the material entails a considerable loss of time and the loss of solvent. Specifically, it is known that polyethylene precipitated from solvents in the conventional manner can be separated from the solvent only partially at most, a residual liquid content of from 30–40% by weight often remaining. This residual liquid content may only be removed slowly by evaporation at comparatively low temperatures, since higher temperatures cause adsorption and fusion of the polyethylene particles during the drying.

Attempts have also been made to precipitate the polyethylene from its solution in a suitable solvent by the addition thereto of a non-solvent for the polyethylene while simultaneously effecting mechanical comminution of the precipitating mass. The non-solvent is introduced into the polyethylene solution either while the solution is still hot or after it has been cooled, the non-solvent being added in such quantities that the plastic is precipitated in the form of small particles. This technique, however, has the disadvantage that considerable quantities of solvents are needed and also that it is uneconomical to carry out. Thus, only a part of the liquid mixture is separated from the precipitating polyethylene, the remainder adhering thereto being necessarily distilled off in order to recover it for reuse.

It is also known that pure polyethylene films have certain disadvantages in practice. For instance, the tension-corrosion and contraction of a film of pure polyethylene is relatively high, so that in using coated metal objects cracks in the polyethylene often appear which decrease the desired protective effect. Additionally, in many cases, for example in textile coatings, the flexibility of a pure polyethylene film is insufficient for optimum practical utilization. It is furthermore known, that the readiness of the pure polyethylene to accept foreign matter, such as pigments or filler materials, is limited, so that difficulties are also encountered where, for instance, strongly pigmented polyethylene films are desired.

In order to improve the qualities of polyethylene, it has been suggested to process polyethylene with polyisobutylenes, such as in the case of products known by the trade name "Oppanol." The polyethylene and the additive material in this regard are melted together and intermixed; however, attempts to produce from this product a dry, fusible and very finely divided powder in an economic manner heretofore have not met with success.

Particularly for coating purposes, according to another suggestion, a solution of the additive material is produced in an organic solvent and polyethylene powder is dispersed in this solution. The considerable disadvantages of this procedure nevertheless are first, that a dry powder cannot be obtained from the mixture of the two constituents and second, that an organic liquid is always necessary as dispersion medium.

It is an object of the invention to provide a process for the production of dry, finely divided, and fusible polyethylene powder which is economical and simple to carry out and is efficient in operation.

It is another object of the invention to provide a process for the production of polyethylene powders of desired constant size in dry form. It is a further object of the invention to provide a process for the production of such polyethylene powders from a mixture of organic liquids, one of which is a solvent for polyethylene and the other of which is a non-solvent for polyethylene.

It is a further object of the invention to provide a process for the production in finest powder form of a material which contains polyethylene in intimate mixture with additive materials.

Other and further objects of the invention will become apparent from a study of the within specification and accompanying examples.

In accordance with the present invention, it has been found that dry, finely divided, and fusible polyethylene powders may be produced by dissolving the raw polyethylene material in a solvent for polyethylene in admixture with a non-solvent for polyethylene which has a higher boiling temperature than said solvent for polyethylene, subsequently distilling off at elevated temperatures substantially all the polyethylene solvent and thereafter the portion of non-sovent remaining. As a consequence of such distillation, the polyethylene precipitates in finely divided form and has excellent flowability properties. During the distillation step a simultaneous, mechanical agitation of the attendant liquid mixture and the precipitating polyethylene mass is effectively carried out whereby uniform heat distribution and distribution of the non-solvent throughout the polyethylene mass is effectively maintained.

For example, by the use of organic liquid mixtures having a ratio of solvent to non-solvent of from 2 to 5:1, a solution temperature of at least 70° C. is required for dissolving the polyethylene. By solvent extraction, i.e. distillation, the solvent and then the non-solvent are removed whereby the polyethylene is precipitated and is recovered in dry, finely divided form. Distillation may be carried out at temperatures below 70° C. or above 70° C.

In accordance with the process of the invention non-solvents which are particularly useful include those organic compounds having a boiling temperature which is preferably at least 10° C. and preferably at most 70–80° C. above the boiling temperature of the solvent used. Particularly suitable are those non-solvents for polyethylene which have a boiling temperature within the range of about 40–60° C. above the boiling temperature of the solvent. Specifically, non-solvents, having a boiling temperature which is within the range of about 90–100° C. up to about 170° C., may be used. Non-solvents, having a boiling temperature range between 120–150° C., are most preferred. As solvents for the polyethylene, organic compounds are preferred which boil in the range of about 70 to 150° C. and especially those which have a boiling temperature within the range of about 75–120° C.

Fundamentally all conventional solvents for polyethylene may be used, in accordance with the process of the invention, which have a boiling temperature which is below that of the simultaneously used non-solvent for polyethylene and preferably within the above-mentioned boiling temperature ranges. Among such organic solvents, which may be used, are: halogen containing hydrocarbons, such as carbon tetrachloride, trichloroethylene, perchloroethylene, aromatic hydrocarbons, such as benzene, toluene, and xylene, hydroaromatics and the like. In addition to their affording excellent results in the conversion of the raw polyethylene to finely divided, dry fusible powders, the halogenated hydrocarbon solvents are particularly advantageous in that they are non-combustible and enhance the safety factor of the operations. The term "polyethylene solvent," as used in the specification and claims, means an organic liquid which will dissolve solid polyethylene at elevated temperatures to form a clear solution.

Among the non-solvents which may be used, in accordance with the invention, are those which, as aforesaid, have boiling temperatures which are above those of the concomitantly used solvent. Examples of these solvents are: aliphatic hydrocarbons or mixtures of these hydrocarbons, such as petroleum benzine and the like or organic compounds which preferably contain oxygen. Examples of these are: alcohols, ethers, ketones, aldehydes and ether-alcohols. As for the alcohols which may be used, any aliphatic alcohol, such as propanols, butanols, pentanols and the like, may be used. The ethers may be: dialkyl ether, alkyl-aryl ether, and the like, while the ether-alcohols may include: ethers of higher alcohols and preferably half-ethers of glycol, such as methyl-, ethyl-, propyl- and butyl-glycol. The ketones include dialkyl ketones, cyclo ketones, methyl alkyl substituted cyclo ketones and the like. The term "polyethylene nonsolvent," as used in the specification and claims, means an organic liquid which will not dissolve solid polyethylene at elevated temperatures below the melting point of polyethylene to form a clear solution.

The solvents and non-solvents must not be reactive with one another nor with the polyethylene, although the solvents and non-solvents should be practically unlimitedly miscible with one another. High miscibility is needed so that even distribution of the non-solvent in the resulting organic liquid mixture will be ensured. The presence of the non-solvent does not retard polyethylene dissolution or increase the viscosity of the resulting organic liquid mixture.

The process, in accordance with the present invention, fundamentally differs from conventional dispersion processes in connection with high molecular weight plastic materials wherein the fine particles are obtained by slowly cooling a super-saturated solution of the plastic material with simultaneous, vigorous, mechanical agitation. The known processes effect comminution of the precipitating polyethylene by physical and/or mechanical influence; while, in accordance with the process of the invention, fine, dry, fusible polyethylene powders are obtainable through the use of non-solvents for polyethylene which are distributed throughout the precipitating polyethylene mass in an advantageously uniform manner. Accordingly, for the most part, the fine distribution of the polyethylene, upon precipitation, is independent of physical and mechanical influence on the solid material, the agitation employed being merely necessary to ensure uniform distribution of heat and non-solvent throughout the precipitating mass.

Upon dissolving the raw polyethylene material in the mixture of solvent and non-solvent, therefore, at elevated temperatures, a uniform distribution of the polyethylene over the entire solution is obtained, thereby providing a direct contacting of the individual polyethylene molecular chains with the non-solvent. Because of the selection of the boiling temperatures of both the solvent and non-solvent for polyethylene, in accordance with the invention, upon heating to elevated temperatures, substantially all of the solvent may be distilled off from the polyethylene solution without influencing the uniform distribution and mixture of the polyethylene and non-solvent in the remaining mass. After a sufficient amount of solvent has been distilled off from the mixture, the effect of the non-solvent begins to become preponderant so that the polyethylene is precipitated. As a consequence of the substantially uniform and intimate distribution and mixture of the polyethylene and non-solvent in the solution, upon precipitation of the polyethylene therefrom, each precipitating polyethylene particle is immediately enveloped by a sheath of non-solvent liquid. An extremely fine distribution of the polyethylene particles is thus provided, on the one hand; while, on the other a fusing of these fine particles to form larger grains is particularly prevented.

It will be appreciated that it is essential that the fine distribution and liquid sheath protection of the small particles will be effected and maintained independently of any mechanical or physical influence on the precipitated high molecular material, due solely to the chemical characteristics of the non-solvent. While the solvent is being continuously removed by distillation, a sufficient amount of non-solvent will always remain for the protection of the fine particles of polyethylene which precipitate and only after substantially all of the solvent has been removed, the residual portion of the non-solvent will be drawn off. In this way the fusing together of the fine polyethylene particles is entirely prevented.

It is important during the removal of the solvent that the non-solvent be completely uniformly distributed throughout the polyethylene particles which precipitate. This may be carried out by mechanically agitating or kneading the precipitated polyethylene mass. If such simultaneous, mechanical agitation or kneading is omitted, satisfactory dry, fusible, polyethylene powders may not be obtained. Such mechanical agitation, in accordance with the invention, fundamentally differs in kind from the mechanical stirring applied in conventional precipitation processes. While, in such conventional processes, the agitation must be vigorous and violent, in order to mechanically break up the individual particles, in accordance with the invention, comparatively slow running devices may be used in which mechanical fragmentation of the particles is not obtained but merely the kneading of the resultant damp, polyethylene mass in sufficient manner during the solvent removal whereby a uniform distribution of the non-solvent over the entire polyethylene mass is maintained.

It will be noted that if this measure is omitted, the vapor current of the solvent evaporating from the interior of the polyethylene mass which precipitates will wash away the non-solvent sheath surrounding the polyethylene particles lying in the path of said vapor. In this way, these polyethylene particles are vulnerable to immediate attack by the hot solvent, such solvent becoming, superficially at least, partially adsorbed on the particle surfaces causing the same to at least partially fuse together. The mechanical heating or agitation of the precipitated polyethylene mass also serves to facilitate the emergence of the solvent vapor therefrom so that a washing action is avoided and the non-solvent sheath around the individual polyethylene particles is uniformly maintained.

The fundamental difference in the mechanical treatment of the product, in accordance with the invention, in contrast to that conventionally used, is a direct result of the particular device employed. Accordingly, while in conventional processes, high speed stirrers and agitators are used; in the present invention, the application of mixing devices, such as kneaders and similar type equipment whereby the polyethylene mass and continuously forming polyethylene powder are well worked through, is contemplated. Even though the agitation is comparatively slow, with respect to the conventional processes, more uniform results are obtained. Examples of other devices which are suitable for this mechanical treatment are stirring apparatus, the stirrers of which are designed such that the solid material in the vessel is satisfactorily worked through so that the lower parts of the contents are constantly moved in upward direction and reversely. These stirring apparatus are preferably operated at a very low speed, for example, at a speed of the stirrer of one revolution in, for example, 1 to 10 seconds. It will immediately be obvious that a stirrer rotating at such a low speed has not influence at all on the particle size of the polyethylene product itself.

The dissolving of the polyethylene in the organic liquid mixture is carried out at elevated temperatures, preferably below the softening or melting point of the particular polyethylene used. Furthermore, it is also preferred that the solution of the polyethylene be effected at a temperature below the boiling temperature of the solvent. In this way, the need for auxiliary equipment, such as reflux coolers or pressure vessels, is eliminated and the additional expenses connected therewith are also eliminated. Suitable temperature, for effecting the solution of the polyethylene, lies within the range of about 70–95° C. and preferably within a range of from about 80–90° C. For accelerating the dissolving step, the reaction mixture in the reaction vessel is agitated by customary stirring devices. One feature of the invention involves the step of dissolving the polyethylene at first in the solvent therefor and upon complete dissolution therein, adding the necessary quantity of non-solvent. In accordance with this feature, the added non-solvent either is pre-heated or provision for sufficient heat in the reaction zone must be made so that none of the polyethylene is precipitated during such non-solvent addition.

The removal of the solvent and non-solvent organic liquids is preferably carried out under vacuum distillation conditions. This provides not only a considerable shortening of the duration of the distillation step but also an economically and technically satisfactory removal operation. Otherwise, at normal pressure, the distillation step would require temperatures for distilling the liquids which might lie above the softening or melting temperatures of the polyethylene materials. In the latter case, the fine distribution of the precipitated powder would be adversely affected.

In accordance with the distillation of the organic liquids, it is preferred, in accordance with the invention, not to employ a constantly strong vacuum but rather to increase the degree of vacuum as the distillation progresses. In this way, a controllable speed of removal of the liquids is obtained as well as the ordinal distillation first of the essentially lower boiling solvent for the polyethylene and, after its substantially complete removal, then the higher boiling non-solvent for the polyethylene. Thus, for example, the final vacuum pressures employed may be from 3–10 mm. Hg, or even lower if necessary.

The distillation step is preferably carried out at temperatures only slightly below the temperature range for dissolving the polyethylene. It is preferred that such distillation temperatures do not go below the temperatures about 35° C. below the solution temperature, and preferably do not go below 25° C. below the solution temperature. The maintenance of this increased temperature during the distillation of the solvent mixture as well as the precipitation of the polyethylene mass is a necessary expedient in accordance with the process of the invention. Thus, it is not possible at low temperatures, for instance, room temperatures, to obtain practically dry polyethylene powder without considerable loss of solvent and without the need for an unduly long reaction period. It will be understood that the liquid particles retained at lower temperatures, which may constitute up to 30–40% by weight of the reaction products, for speedy removal and economical recovery must be separated at said higher temperatures. Of course, at these higher temperatures the heat used for dissolving the polyethylene material in the organic liquid is available in the distillation and precipitation steps so that only additional heat needed to raise the temperature of the reaction mass to the boiling temperatures of the polyethylene solvent and non-solvent organic liquids has to be applied.

If the distilling off of the solvent mixture is carried out under vacuum conditions, a slight cooling of the reaction mixture, at least at the start of the distillation, where comparatively large quantities of the more readily volatile solvent are present, may occur. Such slight cooling, however, does not adversely affect the distillation operation and may even be desirable. In this connection, such cooling may assist the over-all effect of solvent removal, i.e., it may facilitate the initial precipitation of the finely divided polyethylene. By slightly lowering the reaction temperature, in accordance with the invention, a temperature below the critical solution temperature may be obtained whereby fine solid polyethylene particles are precipitated. Since considerable amounts of the polyethylene solvent are simultaneously drawn off, the precipitation of the polyethylene powder is substantially accelerated. The sum of these two precipitation effects makes possible the precipitation of practically the entire amount of polyethylene present in the charge within a very short period of time. Such precipitation may be considered to take place in almost a shock-like manner and substantially completely during this shock-like period. Accordingly, only a few minutes are actually needed for the transition of a clear viscous solution of the polyethylene in the organic liquid mixture to a mass of dry, solid particles. While it is of decisive significance, in accordance with conventional processes, to effect a slow and uniform cooling of the polyethylene solution during the precipitation step, in accordance with the present invention, it is not only insignificant but even undesirable to effect such cooling in a slow and uniform manner. On the other hand, in accordance with the invention, it can be particularly important to effect a rapid and practically instantaneous, complete precipitation of the polyethylene in fine particle form. This rapid and complete precipitation ensures that the fine particles of polyethylene are immediately enveloped with a sheath of non-solvent liquid and removes the possibility of fusion on to such precipitated solid material of particles subsequently forming during the over-all precipitation. Thus, it is possible, in accordance with the invention, to obtain, through the use of a chemically active non-solvent for the polyethylene, a fine powder product within the liquid mixture.

While slight cooling of the reaction mass is not detrimental to the process, substantial lowering of the temperature of the mass during the distillation of the solvent mixture should be avoided. Thus, it is sometimes necessary to supply additional heat to the reaction mixture for this purpose. This may be carried out in accordance with the preferred embodiment of the invention in the customary way, for instance, by heating the reaction vessel itself, and the reaction vessel is preferably heated to temperatures within the aforementioned range of about 80–95° C. In this connection the aforedescribed very intimate kneading or slow agitation during the solvent removal is also significant and advantageous for a uniform distribution of heat throughout the solid polyethylene powder mass.

This additional heat supplied to the reaction mass during distillation and precipitation of the fine polyethylene particles, even though ranging in temperatures up to those closely below the melting and softening temperatures of the polyethylene used, does not adversely influence the size of polyethylene particles recovered. By first removing the polyethylene solvent with the result that the non-solvent liquid remaining forms a liquid sheath around each of the fine particles of polyethylene continuously precipitating, a product is obtained which is made up of the finest individual particles which are stable in the organic liquid medium even at such elevated temperatures and do not tend to form larger particles by fusion with subsequently precipitating particles.

Thus, it is desirable in accordance with this preferred embodiment of the invention that the solution liquids and in particular the solvent are distilled off at or above the temperatures used for the dissolving of the polyethylene and that no cooling be allowed to take place.

In accordance with this embodiment, the distillation of the liquid is effected in particular within the temperature range of from about 70 to about 95° C., the temperature range from about 80 to about 95° C. being particularly preferred.

In this form of execution of the method of the invention, it is of decisive importance that the solvent be distilled off in the increased temperature range. This can be achieved in a relatively simple manner either by effecting the distillation of the liquids and particularly the distillation of the solvent sufficiently slowly so that the amount of heat fed through the wall of the vessel just compensates for the heat loss occurring by dint of the evaporation or else by providing special heating measures, for instance by additionally inserted heating coils or heating surfaces within or about the reaction vessel, so that a sufficiently large amount of heat is transferred to the reaction zone.

In carrying out the invention in accordance with this preferred embodiment, precipitation of the polyethylene by cooling is intentionally entirely avoided. Significantly, the precipitation of the polyethylene takes place only as a result of the removal of the solvent by distillation. Although the precipitation of the polyethylene may not proceed as rapidly in this case as where precipitation enhanced by simultaneous limited cooling is effected, it has nevertheless been found that the polyethylene powders obtained are more homogeneous and uniform in particle size and particle shape. This is due to the fact that an uncontrolled precipitation, such as will always take place to some extent upon cooling, is entirely excluded. This preferred form of execution of the method of the invention thus makes it possible to carry out the production of polyethylene in finely divided form with maximum efficiency with respect to the particle size, uniform fine division and particle shape.

For carrying out this preferred form of execution, it has furthermore been found particularly advisable when distilling the solvent, to operate with an interposed column, the reflux of which is conducted directly into the reaction vessel. In this way, assurance is obtained that the quantities of non-solvent which have been introduced actually remain in the reaction vessel until essentially all of the solvent has been distilled off. In particular it is advisable to use a certain excess of non-solvent, the amount of which corresponds approximately to the amount of non-solvent which may be present in the distillation column during the distillation.

The distillation of the organic liquid mixture is preferably carried out until a practically completely dry powder is obtained. The liquid residue in the polyethylene powder obtained, in accordance with the present invention, amounts to at most about 1% by weight and usually not more than from about 0.2 to 0.4% by weight based upon the polyethylene. In this manner a practically complete recovery of the high boiling non-solvent portion of the organic liquid mixture, as well as of the solvent portion thereof may be obtained so that these components may be recycled once more for further use. Of course, after extended periods of use, additions of polyethylene solvent and polyethylene non-solvent may be required in order to maintain the desired ratio of solvent-to-non-solvent in the organic liquid mixture.

It is a particular feature of the present invention to determine the particle size of the precipitated polyethylene powder to be obtained within comparatively narrow limits with respect to the desired range of size. The determination of the particular size of polyethylene powder is dependent upon the amount and the condition of the non-solvent used. Generally speaking, the particle sizes vary with variations in the ratio by weight of non-solvent to polyethylene. Specifically, the finer the polyethylene powder desired, the more non-solvent in proportion to the polyethylene that should be used; and vice versa, the coarser the granulation of the precipitated powder desired, the less non-solvent in proportion to polyethylene that should be used.

This, of course, illustrates the action of the non-solvent during precipitation of the fine polyethylene particles since the more non-solvent present, the less chance there is for the fine polyethylene particles continuously forming to fuse into larger grains since, as these fine particles are formed, they are immediately enveloped in a sufficiently protective non-solvent liquid sheath.

For carrying out the process, in accordance with the invention, the weight ratios of non-solvent to polyethylene are preferably at least 1:8, and especially within the range of from 1–2:6 to 1:1. Within the afore-stated ranges, one may obtain with small, non-solvent quantities comparatively coarse grained polyethylene powders having a uniform particle size, for instance, preponderantly within the range of from 400–500μ. By employing larger quantities of non-solvent, much finer polyethylene powders are obtainable, having a uniform particle size of from about 0.0001 to 0.3 mm. or 0.1 to 300μ, and preferably below about 40μ, and for instance, between 1 and 10μ.

It will be appreciated, of course, that the quantity of non-solvent may be in excess of the above-stated ratios, the upper limit being merely determined from an economic point of view since, of course, the distillation of the non-solvent liquid which is only difficultly volatile will require longer periods where an excess is used.

Many factors will affect the particular quantity of non-solvent chosen to be used. In this regard, it will be appreciated that there are considerable differences in characteristics among the respective non-solvents which may be used. The molecular make up or constitution or the ratio of polar groups to hydrocarbon groups will, indeed, influence the non-solvent characteristics of the individual compounds chosen as non-solvent liquids. In accordance with the process of the invention, it has been found that the more pronounced the non-solvent characteristics of the non-solvents for polyethylene, the less non-solvent required for obtaining a specifically fine particle distribution.

It is, therefore, preferred, in accordance with the process of the invention, to employ non-solvents which show the most pronounced non-solvent characteristics possible with respect to polyethylene. This will enable the non-solvents to be used in only small quantities so that an efficient, practical, and economical operation may be attained. Thus, advantageously, with only a small amount of non-solvent with respect to solvent in the liquid mixture, upon distilling off practically the entire solvent for polyethylene, a minimum of time and energy are required for final removal of the remaining difficultly volatile non-solvent for polyethylene.

With respect to a specific comparison between butanol and ethyl glycol, i.e., the half-ether of glycol, as non-solvents for polyethylene, it is to be noted that butanol has weaker non-solvent characteristics than the ethyl glycol. Therefore, if an attempt is made to obtain polyethylene in a specific particle size, then it is necessary to use a considerably larger amount of butanol than ethyl glycol. It has been found, in accordance with the present invention, that in order to obtain polyethylene particles of a particular size, about twice as much butanol will have to be used as non-solvent than a given amount of ethyl glycol. On the other hand, the employment of the same quantity of butanol as that of ethyl glycol would result in a considerably finer product in the case of ethyl glycol than that where butanol was used. One fact which may explain this difference is that butanol has only one polar oxygen group for its four carbon atoms while ethyl glycol has two polar oxygen groups for its corresponding four carbon atoms. A further fact, of course, is that the higher boiling temperature of the ethyl glycol permits a smaller quantity of this non-solvent for polyethylene to be used than the quantity of butanol which would have to be used to obtain the same results.

Besides the influence of these non-solvent characteristics, in the production of a fine polyethylene powder, the quantity of non-solvent is also dependent upon the molecular weight of the particular polyethylene, the boiling point difference between the solvent and non-solvent, and the desired grain size of the final polyethylene powder product. In this regard, in order to obtain a specific fine distribution of polyethylene particles, as the molecular weight of the particular polyethylene being treated increases, so also must the quantity of non-solvent therefor. Moreover, the smaller the difference in boiling temperature between the solvent and non-solvent, the larger will be the quantity of non-solvent required for advantageous results since otherwise too great a portion of the non-solvent evaporates together with the solvent during the initial distillation of the solvent from the organic liquid mixture with the result that the final concentration of non-solvent is too small to effect the desired distribution and consequently the final product contains particles of an undesirably large size.

The organic liquid mixture is made up of solvent and non-solvent in a preferred range of parts by weight of at most about 10:1 to preferably about 1:1, i.e. such that the solvent portion will be 50 to 91% and the non-solvent portion correspondingly will be 50 to 9% by weight of the liquid mixture. It is particularly preferred that a range of about 4–8 parts of solvent per part of non-solvent by weight be used, i.e. such that the solvent portion will be 80 to 88.9% and the non-solvent portion correspondingly will be 20 to 11.1% by weight of the mixture. However, in accordance with the process of the present invention, the choice of ratios for solvents and non-solvents is not of fundamental importance although, on the other hand, the ratio of non-solvents to the total quantity of polyethylene used is of such importance. Generally speaking, all organic liquid mixtures may be used which dissolve polyethylene within the temperature ranges indicated. Within such mixtures, therefore, there is at least a sufficient quantity of non-solvent which will amply satisfy the required ratio of non-solvents to polyethylene.

Economy of operation would tend to suggest the desired ratios of solvent to non-solvent since a large excess of solvent present in the organic liquid mixture would only require a longer distillation period and a larger heat requirement for removal during the distillation step. As stated above, the quantity of non-solvent need merely satisfy the required ratio of non-solvent to polyethylene.

In this same connection, the ratio by weight of the organic liquid mixture to the raw polyethylene is only limited by the requirement that sufficient non-solvent be present with respect to the quantity of raw polyethylene. Therefore, it is preferred to use ratios by weight of the organic liquid mixture of solvent and non-solvent to polyethylene starting material of at least 1 to 2:1 and preferably at most about 4:1, i.e. 25:100, although for each 100 parts by weight of solvent-non-solvent organic liquid mixture even 16.6 parts by weight of polyethylene may be present. The only limitation on the lower limit for this ratio is that actual solution of the polyethylene in the organic liquid mixture must take place. It will be appreciated that the upward limit is only determined by economical and technical factors. Naturally, it will be most advantageous to employ as small an amount of organic liquid as possible for the required dissolution of the polyethylene and the desired small size polyethylene particle product.

The polyethylenes which may be used, in accordance with the process of the invention, include all polyethylenes produced according to the conventional high-pressure polymerization process, i.e. low-density polyethylenes. Particularly preferred are high-pressure polyethylenes having a molecular weight within the range of about 5,000 to about 40,000 (as for example determined in accordance with the Staudinger method).

Upon final removal of the last traces of the organic liquid mixture, the precipitated dry polyethylene powder may be recovered by classifying the same into uniform particle sizes by means of conventional sight or separation techniques.

It will be appreciated that the process, in accordance with the present invention, is particularly economical in that the organic liquid mixture may be continuously reused by merely recycling the constituents obtained by distillation and dissolving a new quantity of raw polyethylene therein, thereby practically limiting the cost of conversion of the raw polyethylene into a fine, dry powder to the cost of the heat and mechanical energy requirement. A further advantage provided by the present invention is the production of dry powders which may be transported in dry state in contrast to the hitherto customary polyethylene dispersion products which had to be transported together with the required liquid portion. Thus, while the fine, dry polyethylene powders, produced in accordance with the present invention, are outstandingly suitable in the form obtained for the production of aqueous dispersions, the polyethylene therefor may be transported in light compact condition and converted to the dispersion at the place of final use. Such aqueous dispersions of the fine, dry, polyethylene powder, in accordance with the invention, are far superior to those dispersions containing organic solvents that were heretofore used. Accordingly, by using water instead of conventional organic solvents, for polyethylenes, in these dispersions, not only is a comparatively inexpensive dispersion agent available but also one which is both non-combustible and non-toxic. It may, therefore, be used in all customary equipment without the need for special safety measures.

The dry polyethylene particles, precipitated in accordance with the process of the invention, are obtained as uniform rounded-off, globular granules or particles, in contrast to powders obtained from polyethylene by means of grinding techniques whereby ragged and sharp edges are formed which prevent their work up in uniform layers. Hence, the powders produced, in accordance with the invention, are well rounded and therefore uniformly capable of trickling and passing over one another with a minimum of resistance so that upon dry sprinkling of these powders a layer may be obtained of uniform thickness. The polyethylene powders, obtained in accordance with the process of the invention, do not lump together or fuse as is the case with the hitherto conventionally prepared polyethylene powders and are thus suitable for coating purposes, such as for coating metal, textile and paper.

Example 1

40 kilograms of polyethylene having a molecular weight of 21,000 are dissolved in 160 kilograms of an organic liquid mixture of butanol-trichloroethylene containing 40 kilograms of n-butanol and 120 kilograms of trichloroethylene in a mixer heated to a temperature of about 80–85° C. A clear solution obtained is transferred to a kneader having a shell heated with warm water to a temperature between 85 and 95° C. By the application of a slowly increasing vacuum to the solution in the kneader, at first essentially all the solvent is removed from the solution in increments so that after about 15 minutes solid polyethylene starts to precipitate from the remaining liquid continuously increasing in viscosity. Within the course of the next few minutes, the condition of the organic liquid-precipitate mass changes from a dispersion to a paste and thence quickly to an approximately dry appearing mass of solid particles. By sufficient mechanical manipulation inside the kneader, this mass of solid particles is continuously agitated and broken down to bring any adhering liquid to the outside surface of the mass for efficient evaporation. The speed of distillation is adjusted by the amount of vacuum employed with the proviso that the temperature of the heated polyethylene mass does not go below about 60–65° C. After about an hour, a fine polyethylene powder is produced in the kneader which is practically completely dry. The liquid residue remaining amounts to a maximum of about 0.2 to 0.4%. The powder exhibits an essentially uniform, very fine granulation. The grain size lies preponderantly (90 to 95%) below about 10μ.

Example 2

40 kilograms of polyethylene, having a molecular weight of 21,000, are dissolved, in accordance with the procedure of Example 1, in an organic liquid mixture containing ethyl glycol rather than butanol as used in Example 1. In order to obtain the polyethylene powder in a grain size which corresponds approximately to that obtained in Example 1, a smaller quantity of ethyl glycol is used than the amount of butanol used in Example 1. The organic liquid mixture used for dissolving the 40 kilograms of polyethylene is made up of 126 kilograms of trichloroethylene and 21 kilograms of ethyl glycol. The total quantity of organic liquid used therefor amounts to only about ¾ of the quantity used in Example 1. After the polyethylene has been dissolved, upon the application of a constantly increasing vacuum, the polyethylene precipitate begins to separate after about five minutes and is completely precipitated in a very short time thereafter in a practically shock-like manner. The initial damp-appearing mass quickly gives off further liquid constituents so that after about 10 minutes from the start of the distillation step, a practically dry-appearing powder is present in the kneader apparatus. The distillation of the organic liquid mixture is continued until an essentially dry powder is actually obtained. This corresponds in characteristics and grain size with the particles obtained in Example 1.

Example 3

45 kilograms of polyethylene, having a molecular weight of 18,000, are dissolved in 150 kilograms of an organic liquid mixture of trichloroethylene-butanol (having the same ratio of components as indicated in Example 1). The procedure of Example 1 is carried out and a very fine powder is obtained, having a grain size which lies preponderantly below 10μ.

Example 4

Example 3 is repeated except that ethyl glycol is used in place of butanol in the organic liquid mixture. The ratio of trichloroethylene to ethyl glycol used corresponds to that employed in Example 2. The total quantity of the organic liquid mixture utilized for dissolving the 45 kilograms of polyethylene amounts to 135 kilograms. The polyethylene powder obtained corresponds in yield and characteristics to the very fine powder obtained in Example 3.

Example 5

50 kilograms of polyethylene, having a molecular weight of 14,000, are dissolved in a mixture of 110 kilograms of trichloroethylene and 36 kilograms of butanol. The procedure of Example 1 was followed and a powder yield was obtained in which about 85 to 90% of the particles were of a size below about 10μ.

To obtain a similar sized particle product, alternatively 50 kilograms of polyethylene may be dissolved in 125 kilograms of trichloroethylene and 20 kilograms of ethyl glycol, and the resulting solution worked up in an analogous manner.

Example 6

35 kilograms of polyethylene, having a molecular weight of 38,000, are dissolved in 160 kilograms of the same liquid organic mixture as used in Example 1. By carrying out the process as described in Example 1, the powder yield contains about 90% of a very fine polyethylene powder material.

Example 7

40 kilograms of polyethylene, having a molecular weight of 21,000, are dissolved in 135 kilograms of an organic liquid mixture of 105 kilograms of trrichloroethylene and 30 kilograms of butanol. After distilling off the solvent and subsequently the non-solvent, a dry, polyethylene powder is obtained having particle sizes ranging in distribution as follows:

| | Percent |
|---|---|
| Up to 60μ | 20 |
| Up to 300μ | 50 |
| Remainder more coarse. | |

Example 8

60 kilograms of polyethylene, having a molecular weight of 14,000, are dissolved in 120 kilograms of the organic liquid mixture described in Example 7. The process is carried out as described in Example 1. The precipitated powder has the following composition:

| | Percent |
|---|---|
| Up to 60μ | 25 |
| Up to 300μ | 50–55 |
| More coarse | 20–25 |

Example 9

60 kilograms of polyethylene, having a molecular weight of 14,000, are dissolved in 120 kilograms of an organic liquid mixture of trichloroethylene and ethyl glycol in a ratio of 9:1 (108 kilograms of trichloroethylene and 12 kilograms of ethyl glycol). The process is carried out as described in Example 2. The powder yield is:

| | Percent |
|---|---|
| Up to 60μ | 20 |
| Up to 300μ | 50–55 |
| Remainder more coarse. | |

Example 10

1000 g. of polyethylene having a molecular weight of 24,000 (measured according to Staudinger) are dissolved in about 30 minutes while constantly stirring thoroughly and heating the mixture to +87° C. in a mixture of 3000 g. of trichloroethylene and 1000 g. of n-butylalcohol, which is placed beforehand in a heatable high-speed mixer. The solvent vapors which are formed are condensed by a reflux condenser.

The solution obtained is then placed in a heated kneader, the temperature of which is between +80° C. and 95° C., the solvent and non-solvent components making up the organic liquid mixture are distilled off under vacuum and condensed in a cooling system.

The originally clear solution becomes cloudy with an increase in viscosity after a short time, breaks up into lumps and finally into a fine powder. The complete drying of the powder is carried out over a period of about 60 minutes under a vacuum of 20 mm. Hg. The powder obtained does not contain any particles which would not pass through a test screen according to DIN–40.

Example 11

1000 g. of polyethylene having a molecular weight of 24,000 (measured according to Staudinger) are dissolved in an organic liquid mixture of 4000 g. of a benzine fraction having the boiling range 80 to 110° C. and 1700 g. of n-butyl alcohol while heating to 89° C. in a high speed mixer over a period of 30 minutes. The solution obtained is transferred into a vacuum tight blade-type drier, which can be heated. The solvent is extracted by means of vacuum from the solution at a temperature of 78° C. and there is obtained, after about 100 minutes a fine powder, of which more than 60 parts by weight pass through a test screen with 10,000 meshes/cm.$^2$.

Example 12

100 parts by weight of polyethylene obtained from a high pressure polymerization process and having a molecular weight of 19,000 (measured according to Staudinger) are placed in a stirrer-type autoclave. A solvent and non-solvent liquid mixture of 450 parts by weight of carbon tetrachloride and 150 parts by weight of iso-butyl alcohol is also added. After closing the apparatus, the contents are heated to 85° C., while constantly stirring. After the temperature of the mass has reached 73° C. or higher, the polyethylene starts to dissolve and is completely dissolved in about 2 hours while maintaining the mass at a temperature of 73–80° C. The mass is then cooled to 50° C. As soon as the internal pressure produced by the dissolving temperature has reverted to normal pressure (760 mm. Hg), the solvent vapors are extracted by suction into a vacuum distillation apparatus and the solvent and non-solvent components in the autoclave are distilled off and recovered in known manner. A very fine powder is obtained without coarse constituents, the average grain size thereof being from 3 to 8 microns.

Example 13

100 parts by weight of polyethylene produced by a high pressure polymerization process and having an average molecular weight of 21,000 (measured according to Staudinger) are placed together with 400 parts by weight of toluene and 135 parts by weight of sec. butanol in an autoclave. With the apparatus tightly sealed, the mixture is heated to 95° C. while stirring constantly and is kept at this temperature for 150 minutes, whereby the polyethylene is dissolved. The contents of the autoclave are then cooled to a temperature of 60° C. While maintaining this temperature as far as possible, the solvent is distilled off in vacuo. As soon as the powder is dry, it is cooled to 20° C. while stirring constantly and a mixture of 160 parts by weight of methanol and 75 parts by weight of trichloroethylene is added. After brief but intensive stirring, the powder in the autoclave is transformed by the subsequently supplied solvent mixture into a dispersion with a dry weight of 30%. Such a dispersion can readily be used for coating supporting materials.

If, in accordance with the process of the invention a very large excess of organic liquid mixture is used to obtain a fine distribution of the raw polyethylene therein, it may be expedient during the distillation and precipitation step to precipitate a portion of the polyethylene by cooling the polyethylene solution a certain degree and concomitantly removing the great excess of the organic liquid mixture by distillation. Thence, the remaining still comparatively high content of organic liquid may be removed in accordance with the process of the invention and the remainder of the polyethylene precipitated as well. Of course, it must be noted that enough non-solvent for the polyethylene must be present in the original organic liquid mixture that after the initial cooling and distillation of the large excess of the organic liquid mixture a sufficient amount of non-solvent remains for the favorable precipitation of the polyethylene material in fine particle size and in dry condition.

In such a procedure a portion of the heat energy may perhaps be saved and thus a more economical operation may be provided. It will be appreciated, however, that it is not preferred, in accordance with the process of the invention, that a great excess of organic liquid mixture be used for dissolving the raw polyethylene. Rather, it is preferred to use only the absolutely necessary quantities of organic liquid for dissolving the raw polyethylene so that during precipitation the fine polyethylene particles may be at once precipitated in an advantageously minimum period of time and with the application of an advantageously minimum amount of heat energy and mechanical energy.

In each of the above examples, the polyethylene employed was high pressure-low density polyethylene, i.e. that produced by the so-called high pressure process.

In accordance with a further feature of the invention, it has been found that powdery polyethylene additive mixture materials may be prepared advantageously by intermixing with the polyethylene in the above-mentioned solvent non-solvent liquid mixtures, additive materials such as natural or synthetic high polymers. Upon dissolution in the liquid mixture, the dry, powdery polyethylene additive mixture material may be obtained in accordance with the liquid mixture distillation procedure outlined hereinabove. In this embodiment, it is to be noted that the polyethylene is not dissolved alone in the solvent non-solvent mixture, but rather together with the additive material. From this solution, the desired powder is conveniently obtained in the manner described above.

Surprisingly, the powder formation and separation from the solvent mixture being distilled is not influenced disadvantageously by the presence of the additive material. Instead, the recovery takes place in the same general manner whereby a powder is obtained which has particles, even where they are optionally small, which are made up of an intimate mixture of the polyethylene and the additive material.

The dissolving step of the process according to this embodiment can be effected in various ways. For instance, it is possible to use a mixture of polyethylene and such an additive, which is readily obtainable commercially in intermixed form. For a number of reasons, however, such as for economy, it is preferred to dissolve the polyethylene and the additive separately, simultaneously or one after the other in the liquid mixture of solvent and non-solvent and then to further treat this mixture in accordance with the invention. It is most preferred to first dissolve the additive in the liquid mixture, and then use this solution to dissolve the required amount of polyethylene therein.

Several advantages result from this procedure. For one thing, a separate melting step is saved in which the polyethylene would otherwise be mixed with the additive. Rather, it is possible to bring the pure polyethylene and the additive into intimate mixture in one operation and thereafter simultaneously treat it to form the dry and finely divided powder. Due to the fact that the mixing of the individual solid components takes place in the dissolved phase, the intimate mixture of these solid components is ensured an accomplishment which can be obtained in conventional processes only with difficulty. It is readily apparent that this intimate mixture has a very favorable effect on the qualities of a film which may be produced subsequently from such powder.

In accordance with this embodiment, soluble, natural or synthetic, organic high polymers may be used as additives. Examples of these are natural rubber and synthetic high polymers such as polyisobutylene, polybutadiene, polyisoprene, mixed polymers, such as butadiene-acrylpolymers, for instance acryl-nitrile, chloride rubber and other additives miscible with polyethylene and mixtures thereof. If desired, polyethylene mixtures with the most varied additives may be utilized. From the standpoint of efficient operation, the choice of additives is limited merely by the condition that these additives are at least partially soluble in the liquid mixture of solvent and non-solvent used at the solution temperatures employed. In a practical sense, the choice of additives is further limited by the fact that, for the purpose intended, the mixed constituents in the solid material mixture should be compatible so that they may provide favorable results.

Specifically, in accordance with a further feature of this embodiment of the invention, comparatively high molecular polyethylenes, for instance having a molecular weight of 30,000 to 40,000 and comparatively low molecular polyethylenes for instance having a molecular weight of 2,000 to 3,000 may be treated together. In this instance as well, it is possible to favorably influence the qualities of the resulting polyethylene powder as may be the case in the production of films. Where various polyethylenes are used in admixture, the melting point of the resulting mixture is lowered only slightly, while the melting and blending of the powder particles during the formation of the film is improved considerably over the results formerly obtainable.

The additives may be used in the process in accordance with the invention, preferably in quantities up to about 50% based on the total weight of solid material. Amounts within the range of about 5 to 35 percent by weight are particularly suitable.

It is a recognized fact that today refuse or waste polyethylene results in industry in great abundance. Thus, for instance, packing materials such as foils or sacks made of polyethylene threads, after their useful life become mere waste products which are difficult to reuse. To recover this material, valuable per se, encounters difficulties and is done mainly by melting the waste polyethylene to an inferior granulate, the qualities being lowered considerably by the presence of foreign materials including dirt, printing dyes, and the like.

In accordance with the invention, however, instead of melting the waste material for recovery, the refuse polyethylene is dissolved conveniently in the liquid mixture of solvent and non-solvent, the solution is cleaned in the usual manner, such as by filtration or by treatment with an adsorbing agent, for example, silica gel, active charcoal or similar material, and then treated in the above described manner to produce the desired pure, finely divided powder. It is obvious that the present invention provides for the economic reuse of polyethylene in pure form by convenient recovery from waste materials containing foreign matter.

Hence, dry, finely divided, fusible powders, which contain an intimate mixture of the various solid material components may be readily obtained by the process of the invention. These powder mixtures may be processed without difficulties to aqueous dispersions of high stability, just as in the case of pure polyethylene powders. Advantageously, non-toxic and non-flammable aqueous dispersions of mixtures of different high molecular compounds are also provided in accordance with the invention.

In connection with the use of these powder mixtures, depending on the choice of the additive, the original polyethylene qualities may be favorably influenced. Thus, one can produce, for instance, highly flexible films, the tension corrosion or contraction tendency of which is substantially decreased which exhibit good acceptability for foreign materials, such as pigments or other fillers. Even where heavily pigmented films are desired, good film formation takes place using the powders obtained in accordance with the invention.

Moreover, it is of great importance that according to the process of the invention, resin-like products, for example polyisobutylene, can be treated in comparatively high concentration to form fusible and dry powders with polyethylene although generally they cannot be advantageously prepared alone as powder.

*Example 14*

40 kg. of a polyethylene granulate having a 10% polyisobutylene content is dissolved in a mixture of 160 kg. of trichloroethylene and butanol in the ratio by weight of 4:1 in a heated fast-mixer at 83° C. After about 30 minutes dissolution is complete. The liquid is then dried in a heated vacuum-kneading or stirring machine by distillation. After about 1 hour and 20 minutes a completely even, finely divided powder is obtained in which the polyisobutylene is evenly distributed.

*Example 15*

4 kg. of polyisobutylene having a molecular weight of 100,000 are dissolved in 60 kg. of a mixture of trichloroethylene and butanol in the ratio by weight of 4:1. This liquid is placed with a further 100 kg. of the same organic liquid mixture ratio 4:1 in a heated fast-mixer and then 36 kg. of a polyethylene granulate (mol. weight 20,000) are added. After about 25 to 30 minutes a completely homogeneous solution is produced. Upon distillation in accordance with the procedure of Example 14, after about 80 to 100 minutes, a finely divided powder having a polyisobutylene content of 10% is obtained.

*Example 16*

The procedure of Example 15 is repeated using a polyisobutylene having a molecular weight of 200,000. A finely divided powder having a polyisobutylene content of about 10% is similarly obtained.

*Example 17*

In a 25 liter autoclave, provided with autoclave and water jacket heating means and connected with a distilling column having ten bubble trays, 3 kilograms of polyethylene (Lupolen 1811H), 1.5 kilograms of methylglycol and 9 kilograms of trichloroethylene are introduced. The dissolving of the polyethylene is effected by heating the autoclave to 75 to 80° C. At the same time, the contents of the autoclave are agitated. After about 25 minutes, the polyethylene is dissolved. Thereupon, the temperature in the autoclave is increased, a temperature of 89° C. being maintained therein by the reflux of the liquid.

The removal of liquid through the distillation column is now initiated. After a distillation period of 10 minutes at a temperature of about 80° C., polyethylene begins to settle out in the sump. The sump temperature (80°C.) is about 8 degrees higher than the normal solution temperature of about 72° C. therefore, the precipitation of the polyethylene is due exclusively to the withdrawal of the solvent. During the distillation, the solvent (trichlorethylene) is first distilled off in a purity of about 97% and this is followed by the distillation of the non-solvent (methylglycol).

The polyethylene powder produced is characterized by a particularly uniform particle size and excellent flowability.

*Example 18*

The procedure of Example 17 was repeated. In this case, however, a sump temperature of about 83° C. was established during the distillation.

The polyethylene powder produced is similar in uniform particle size and excellent flowability as the powder obtained in Example 17.

As was already mentioned above, the polyethylene powder or the mixtures of polyethylene powder and additive materials produced by the process of the invention, due to the uniform particle size and the spherical shape of individual powder particles, on the one hand, and possibility of adjusting the particle size within a wide range, on the other hand, are excellently suited for all those applications where polyethylene powders are, for example, used for coating purposes. The possibility of selecting the particle size permits the production of powders of very small particle size which can be used to prepare stable dispersions and especially aqueous dispersions. Moreover, it is possible due to the uniform particle size to achieve the formation of uniform and continuous films already with extremely thin layers applied since in fusing together a layer of the powder of the invention applied either in dry form or in form of dispersions, the fusing individual particles are well bonded together with the corresponding individual particles which are spaced apart at equal distances in all directions so that no spots are formed where holes exist in the polyethylene film in contrast to the hitherto known polyethylene powders of irregular particle size.

The powders of the invention are, for example, suited in dry state or in the form of dispersions for finishes of textiles and for coating metallic surfaces and films. Thus, for example, the dry powder may be spread on or especially aqueous dispersions may be applied to coarse or fine textile fabrics, e.g. jute fabric for the manufacture of bags, using the conventional coating equipment, and subsequently a continuous film may be formed by fusing the particles together. Another example of using the powder is for inner liners of metal drums and for making laminated films, e.g. by applying the powder in dry state or in the form of dispersions to plastic films, paper and the like and subsequently fusing the individual polyethylene particles together to form a continuous film. In addition, it is possible due to the uniform particle size and the free flowing properties of the powder to obtain layers of particularly uniform thickness in spreading the powder, e.g. in conventional knife coaters.

*Example 19*

500 gms. of polyethylene granules having a molecular weight of 17,000 are dissolved at 80–85° C. with constant stirring in 1,500 gms. of a mixture of toluene and butanol in a ratio by weight of 3:1 contained in a glass beaker, and thereafter dried under vacuum in a vessel with stirrer heated with warm water of 80 to 85° C. The result is a fine dispersible powder of polyethylene.

*Example 20*

500 gms. of polyethylene granules having a molecular weight of about 20,000 are dissolved at a temperature of at least 70° C., but below the melting point of the polyethylene, in 1600 gms. of a 6:1 mixture of toluene and ethyl glycol with constant stirring. Hereafter, this solution is dried under vacuum in a vessel equipped with a stirrer and heated with warm water of about 80 to 90° C. The product obtained was a fine dispersible powder.

*Example 21*

400 gms. of polyethylene granules having a molecular weight of about 30,000 are dissolved in 1400 gms. of a 5:1 mixture of toluene and ethyl glycol at a temperature of at least 70° C., but below the melting point of the polyethylene, while constantly stirring. As soon as a clear solution is obtained, the same is dried under vacuum in the manner described in Examples 19 and 20. A fine dispersible powder is obtained.

*Example 22*

As described in Examples 19, 20 and 21, 400 gms. of polyethylene having a molecular weight of about 17,000 are dissolved in 1200 gms. of a 4:1 mixture of trichlorethylene and methyl isobutyl ketone. Upon drying under vacuum as in Examples 19, 20 and 21, a fine dispersible powder is obtained.

*Example 23*

400 gms. polyethylene having a molecular weight of 20,000 are dissolved in 1500 gms. of a 7:1 mixture of trichlorethylene and butyl ether in the manner described in Examples 19 to 22. Upon drying under vacuum as in Examples 19 to 22, a fine dispersible powder is obtained.

What is claimed is:

1. Process for the production of dry, finely divided, fusible polyethylene powder from a mixture of organic liquids, which comprises dissolving polyethylene at an elevated temperature in a polyethylene solvent in admixture with an organic non-solvent for polyethylene having a higher boiling point than that of the polyethylene solvent, substantially completely removing said solvent and thereafter the portion of said non-solvent remaining at elevated temperatures while maintaining the resultant decreasingly attendant organic liquids and increasingly precipitating solid polyethylene mass in continuously agitated condition, and recovering the dry, finely divided, fusible polyethylene so formed.

2. Process, according to claim 1, wherein said non-solvent has a boiling point within the range of from 90° to 170° C.

3. Process, according to claim 1, wherein said non-solvent is an oxygen containing organic liquid compound.

4. Process, according to claim 1, wherein the solvent for polyethylene has a boiling point within the range of from 70° to 150° C.

5. Process, according to claim 1, wherein the solvent for polyethylene is a halogen-containing hydrocarbon.

6. Process, according to claim 1, wherein said polyethylene is dissolved at a temperature below its softening point.

7. Process, according to claim 1, wherein said solvent and said non-solvent are removed under reduced pressure.

8. Process, according to claim 1, wherein the ratio of amount by weight of non-solvent to polyethylene is at least 1:8.

9. Process, according to claim 1, wherein the weight ratio of solvent to non-solvent in the liquid mixture used is within the range of about 10:1 to 1:1.

10. Process, according to claim 1, wherein the ratio by weight of solvent-non-solvent liquid mixture to polyethylene is at least 1 to 2:1 and at most 4:1.

11. Process for the production of dry, finely divided polyethylene powder which comprises distilling off solvent from a solvent solution of polyethylene containing therein a liquid organic non-solvent for polyethylene having a higher boiling point than that of said solvent and continuing said distillation until solid, finely divided polyethylene is formed, and thereafter separating finely divided polyethylene from said liquid.

12. A process for the production of finely divided polyethylene and dispersions thereof which comprises dissolving polyethylene at a temperature of at least 70° C. in a mixture comprising a solvent for polyethylene and an organic non-solvent for polyethylene in a ratio of between 2 and 5:1 parts by weight and precipitating the polyethylene therefrom by distillation of the said mixture.

13. A process according to claim 12 wherein the polyethylene is dissolved at a temperature of at least 70° C. in a mixture comprising at least one organic solvent for polyethylene selected from the group consisting of aliphatic, cyclic and chlorinated hydrocarbons, and at least one organic oxygen containing non-solvent for polyethylene selected from the group consisting of higher monohydric alcohols and ethers of polyhydric alcohols.

14. A process for the production of finely divided polyethylene which comprises dissolving polyethylene while stirring and heating to a temperature between 85° and 90° C. in an organic liquid mixture of trichlorethylene and n-butylalcohol, distilling off said mixture at a temperature of from 80° to 95° C. and drying the powder so obtained under vacuum.

15. Process according to claim 11 wherein an additive polymer material soluble in said solvent solution is added thereto prior to the distilling.

16. Process according to claim 15 wherein the additive material is present in an amount up to 50% by weight based on the total solids content.

17. Process according to claim 11 wherein the polyethylene used is waste polyethylene contaminated by foreign material, said polyethylene being dissolved in said solvent and separated from said foreign materials prior to said distilling.

18. Process according to claim 11 wherein the solvent and non-solvent are distilled off at a temperature at least as high as the solution temperature for the polyethylene.

19. Process according to claim 11 wherein the solvent is distilled off at a temperature at least as high as the solution temperature for the polyethylene.

20. A method for reducing the particle size of polyethylene which comprises dissolving relative proportions of at least 25 parts by weight polyethylene at a temperature less than the melting point of the polyethylene in the range of 70°–95° C. in 100 parts by weight of a solvent-nonsolvent mixture, and distilling and agitating the resulting mixture at said temperature for a period sufficient to form finely-divided polyethylene, said solvent-nonsolvent mixture consisting essentially of 50%–91% by weight of at least one hydrocarbon solvent for polyethylene selected from the group consisting of aliphatic, cyclic and chlorinated hydrocarbons, the balance being at least one polar nonsolvent for polyethylene selected from the group consisting of higher monohydric alcohols and ethers of polyhydric alcohols.

21. The method according to claim 20 conducted at 80°–95° C.

22. The method according to claim 20 wherein said solvent-nonsolvent mixture contains 80–88.9% by weight of a hydrocarbon solvent for polyethylene.

23. The method according to claim 20 wherein said hydrocarbon solvent for polyethylene consists of benzine fraction.

24. A method of reducing the particle size of polyethylene which comprises dissolving relative portions of about 16.6 parts by weight polyethylene at a temperature less than the melting point of the polyethylene in the range of 70–95° C. in 100 parts by weight of a solvent-non-solvent mixture, and distilling and agitating the resulting mixture at said temperature for a period sufficient to form finely-divided polyethylene, said solvent-non-solvent mixture consisting essentially of at least one hydrocarbon solvent for polyethylene selected from the group consisting of aliphatic, cyclic and chlorinated hydrocarbons, the balance being at least one polar non-solvent for polyethylene selected from the group consisting of higher monohydric alcohols and ethers of polyhydric alcohols.

References Cited by the Examiner
UNITED STATES PATENTS

| | | | |
|---|---|---|---|
| 2,313,144 | 3/1943 | Gomin | 260—32 |
| 2,858,902 | 11/1958 | Cottle | 260—94.9 |
| 2,870,113 | 1/1959 | Jones | 260—34.2 |
| 2,945,020 | 7/1960 | Hall | 260—94.9 |

JOSEPH L. SCHOFER, *Primary Examiner.*

JULIUS FROME, L. H. GASTON, M. LIEBMAN,
*Examiners.*